Aug. 30, 1932.  G. D. PARKER  1,875,259
APPARATUS FOR WIRE BINDING BOXES
Filed Nov. 1, 1921   11 Sheets-Sheet 5
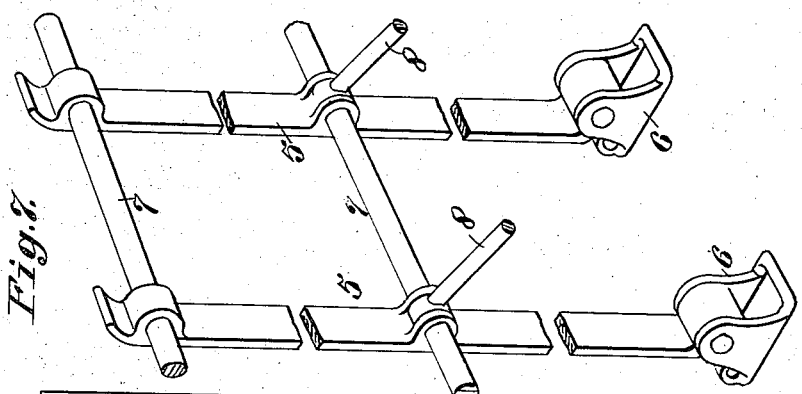
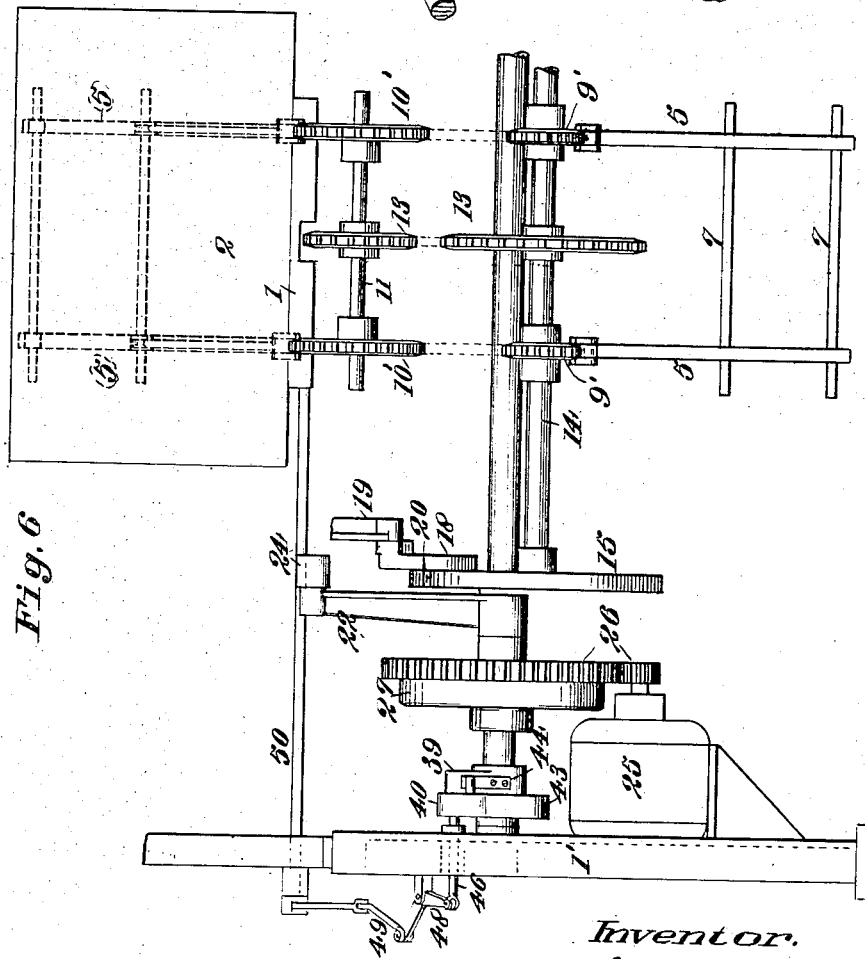
Inventor.
Geo. D. Parker
By Acker & Joleen
his Attorneys.

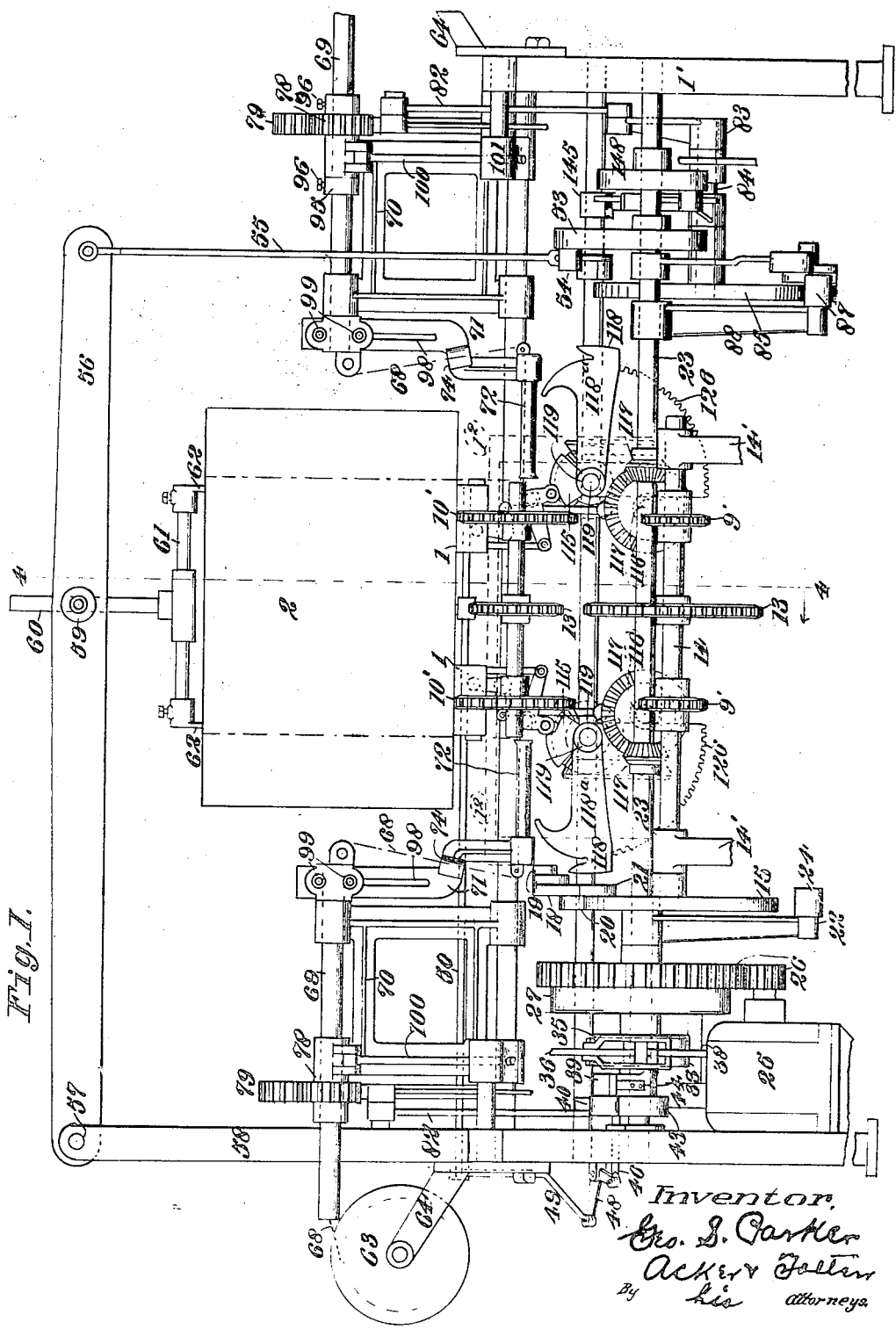

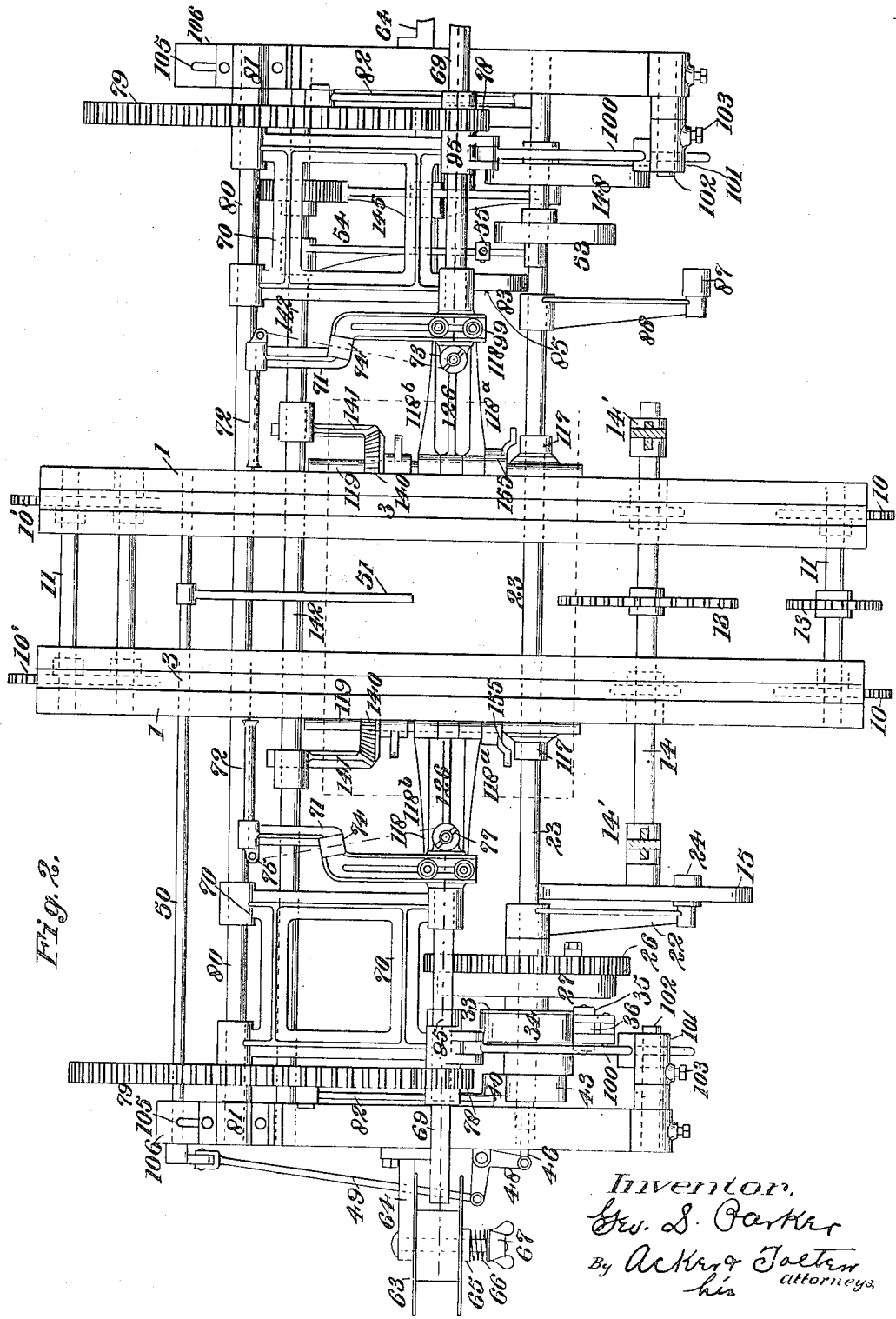

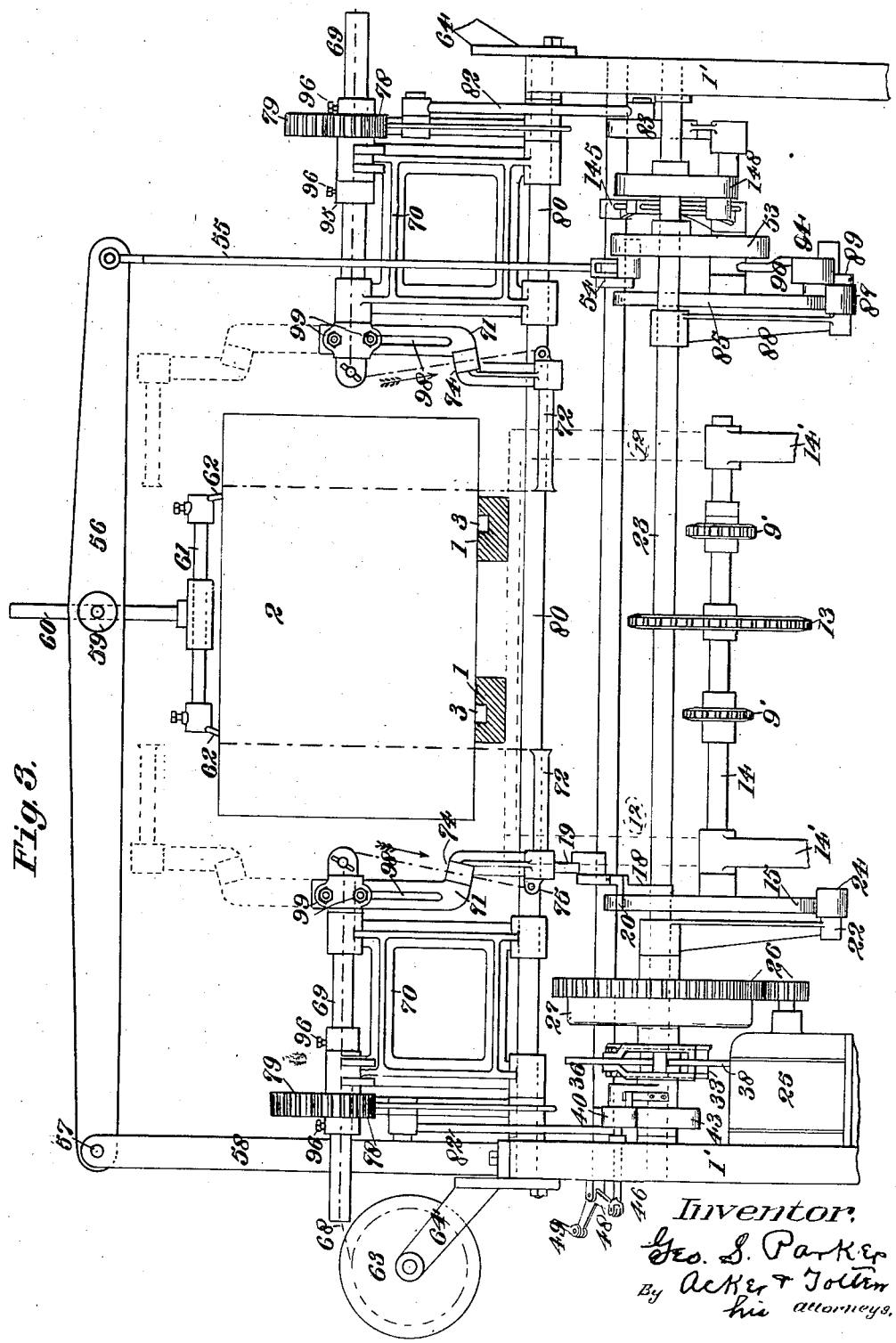

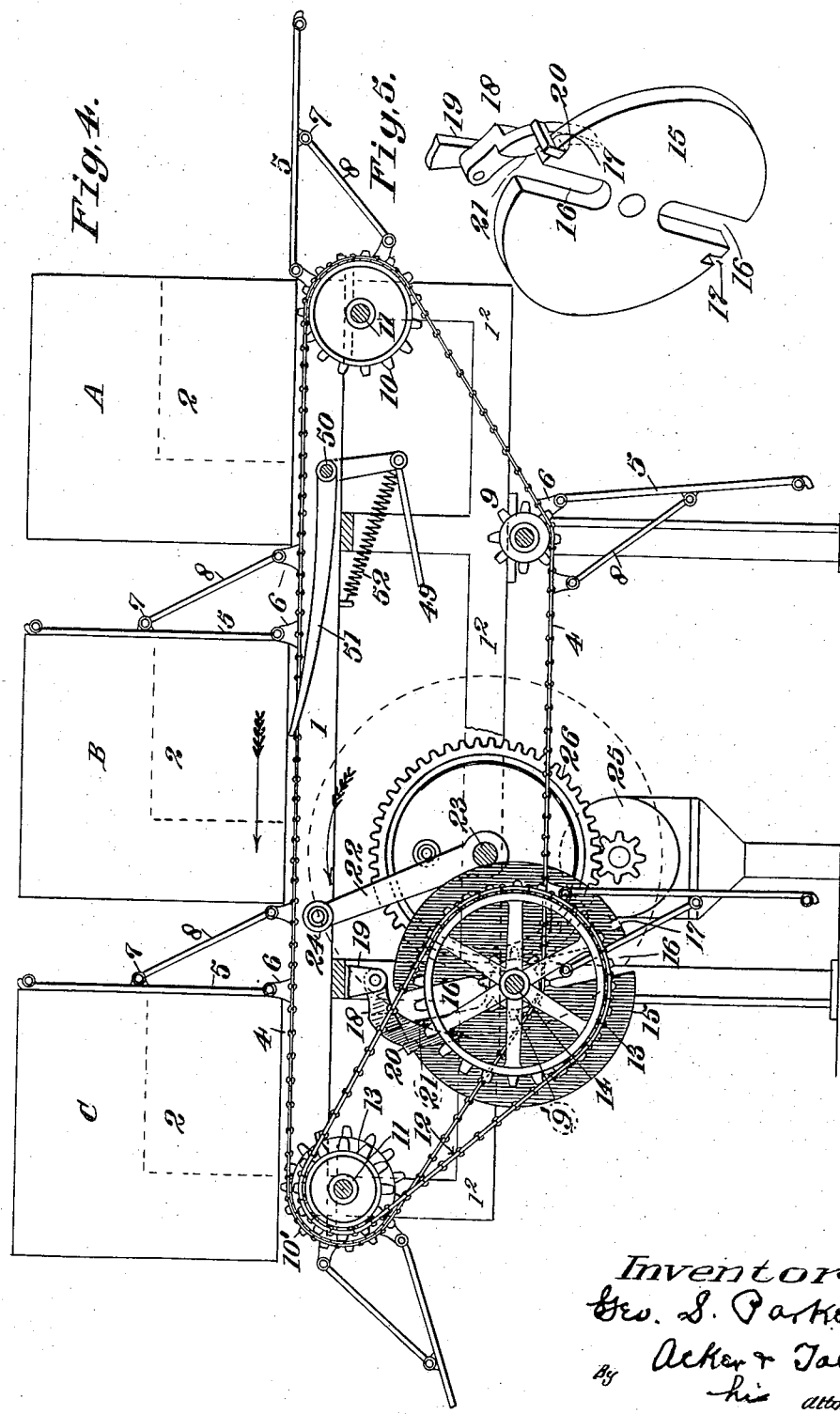

Aug. 30, 1932. G. D. PARKER 1,875,259
APPARATUS FOR WIRE BINDING BOXES
Filed Nov. 1, 1921 11 Sheets-Sheet 6
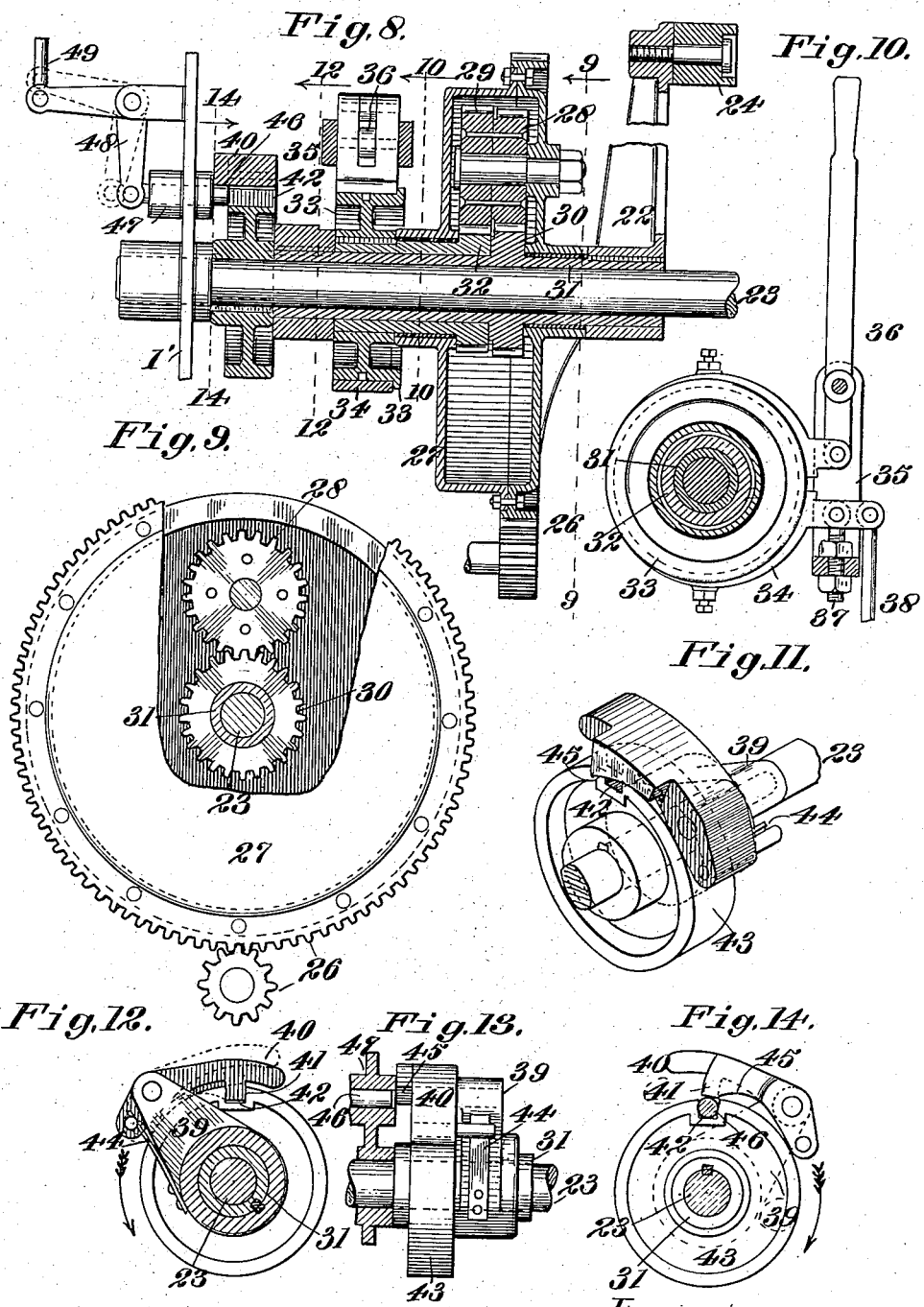

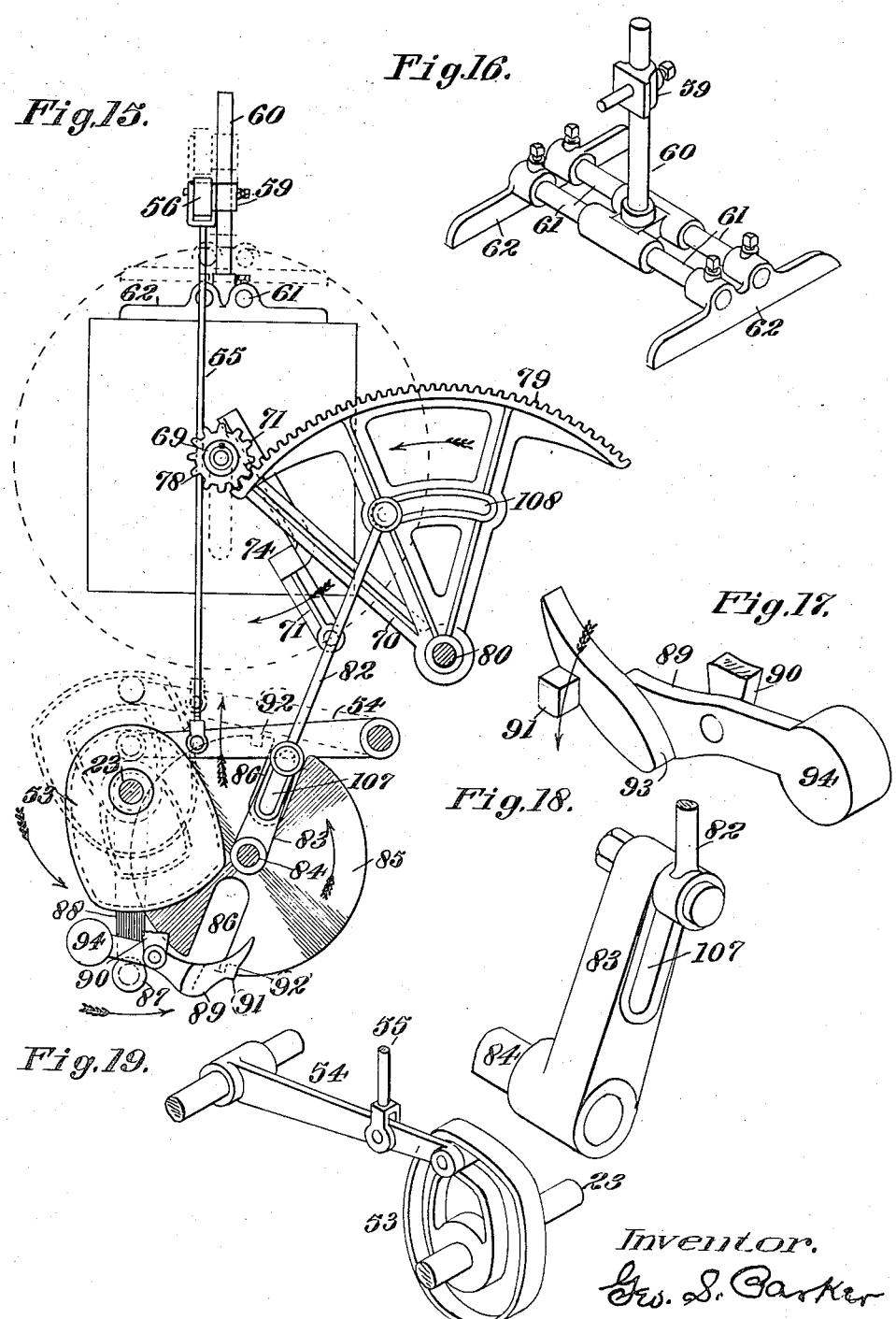

Aug. 30, 1932.    G. D. PARKER    1,875,259
APPARATUS FOR WIRE BINDING BOXES
Filed Nov. 1, 1921    11 Sheets-Sheet 8
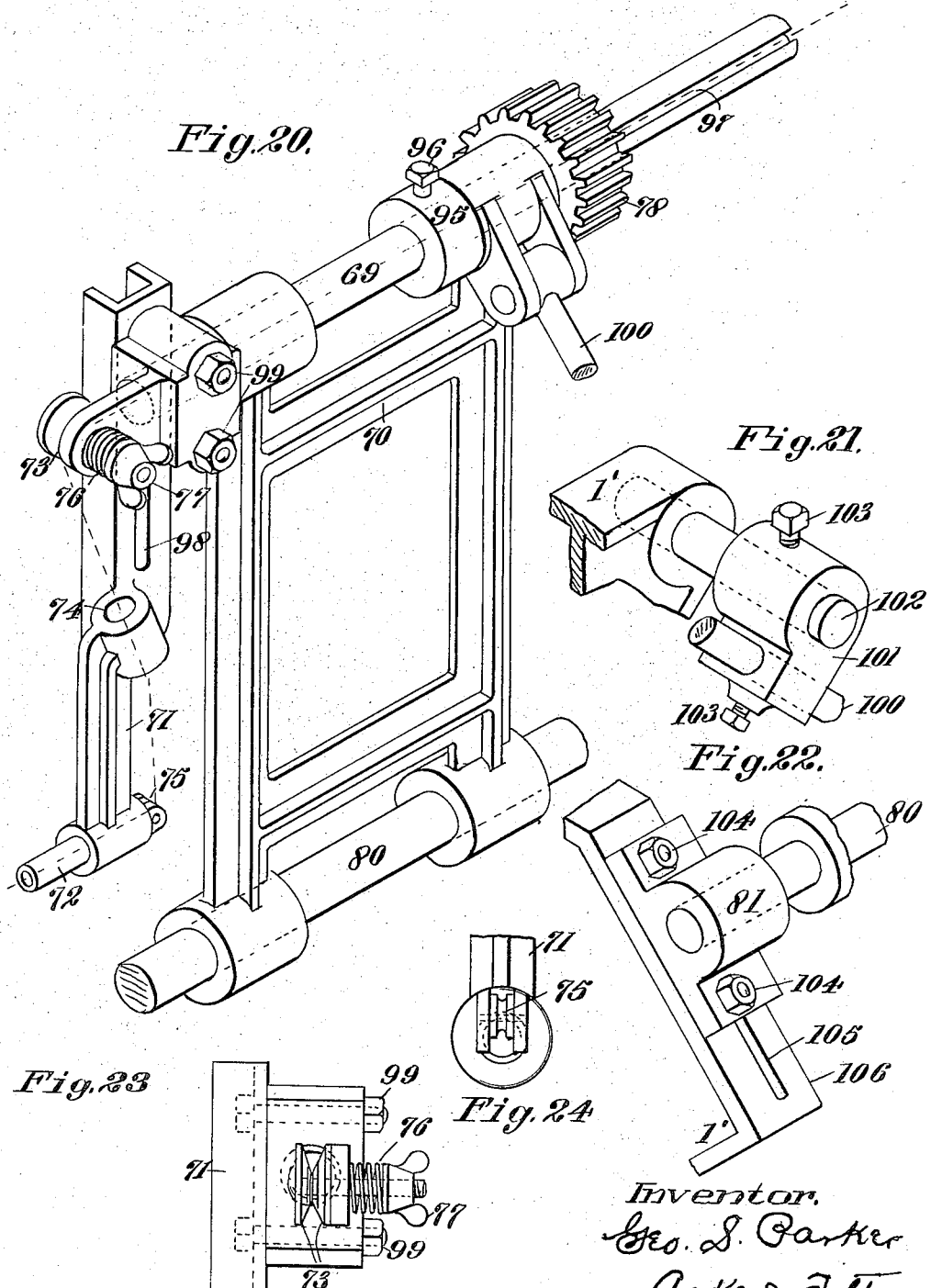
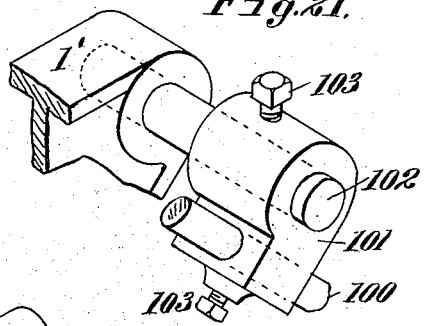
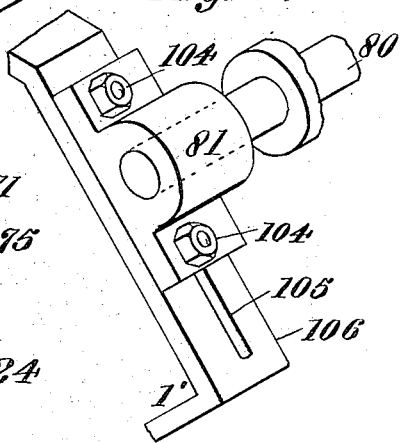
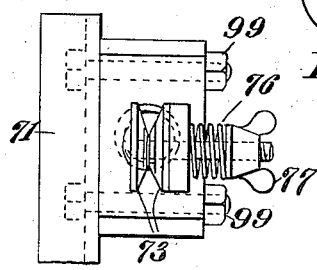

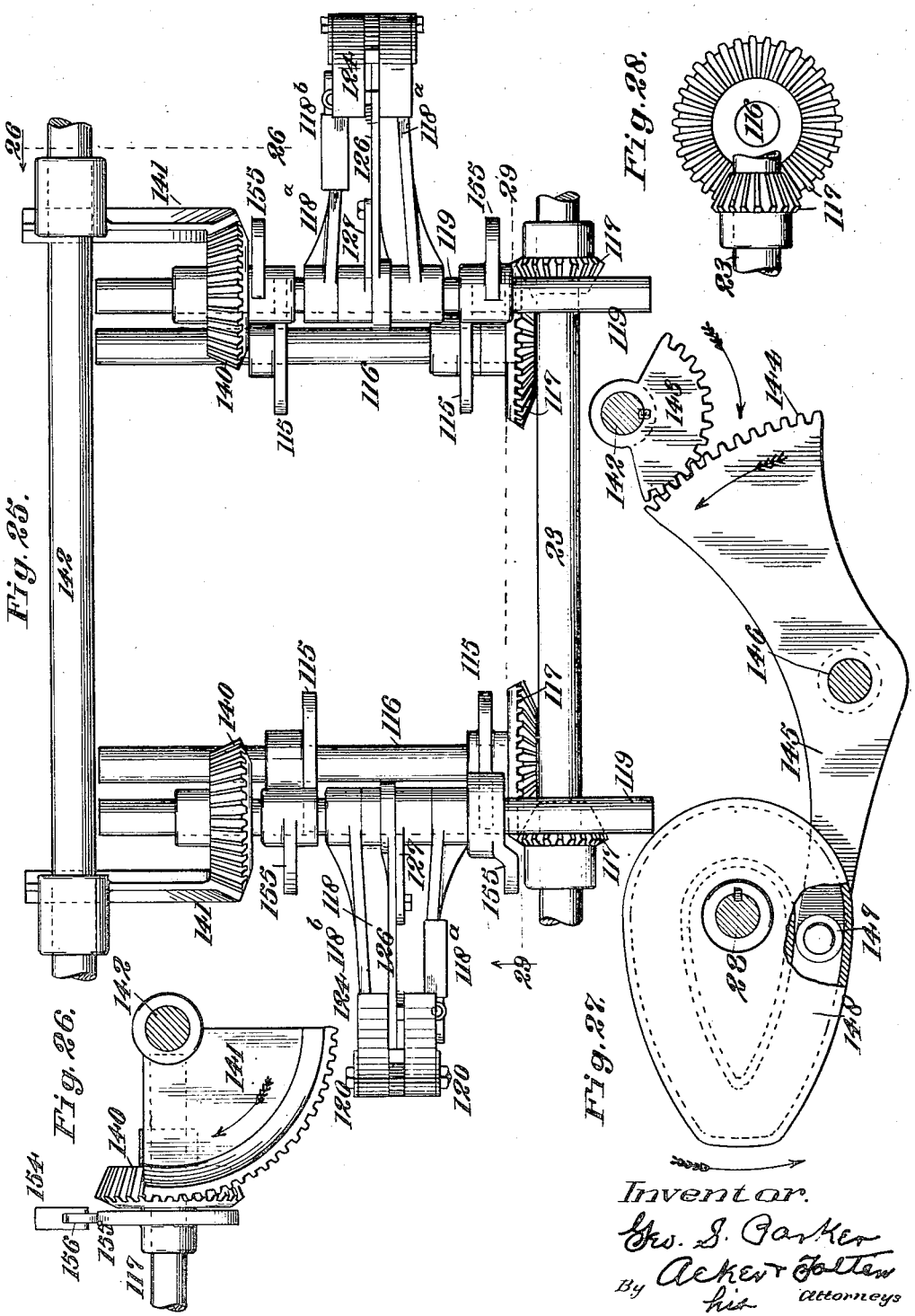

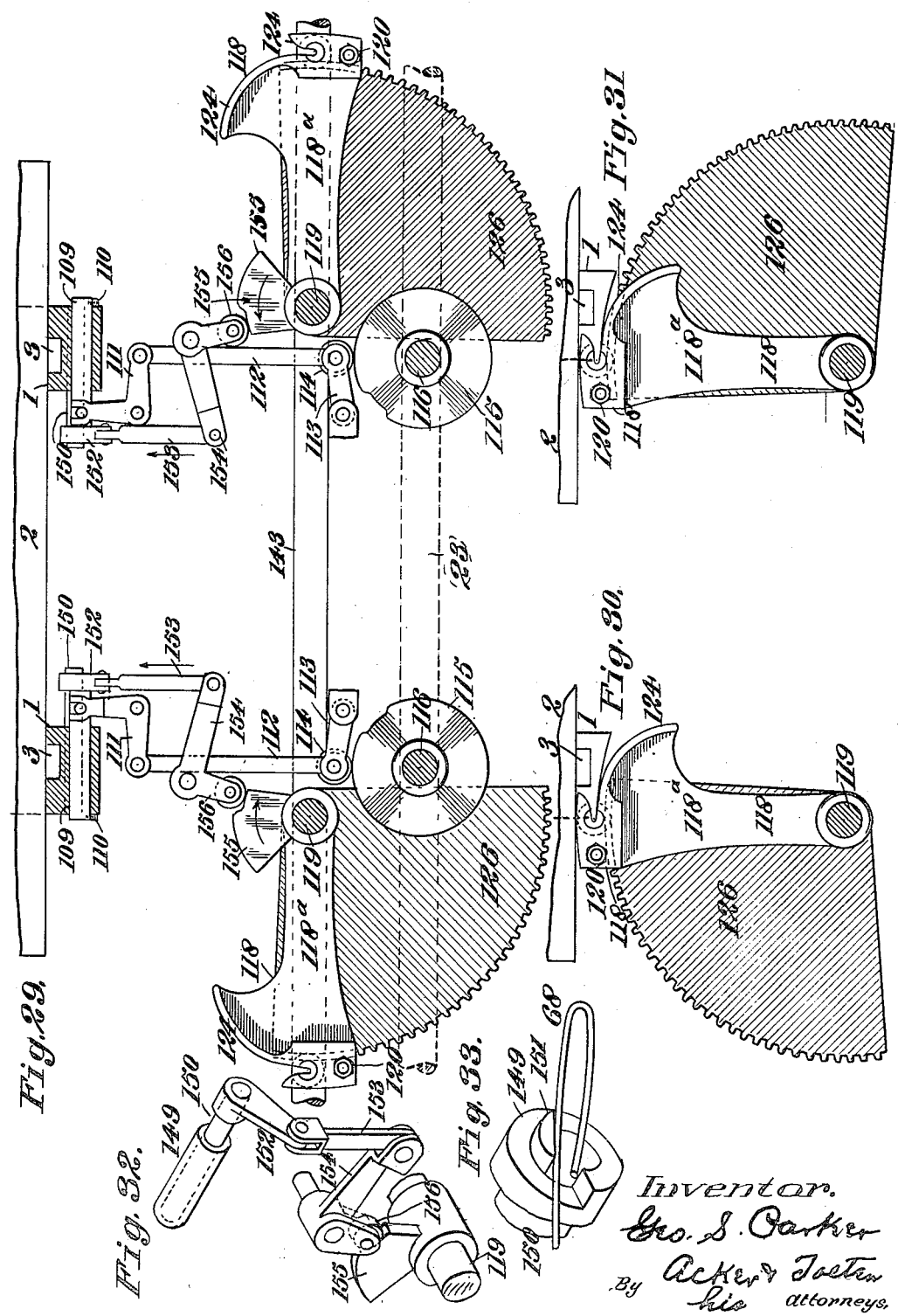

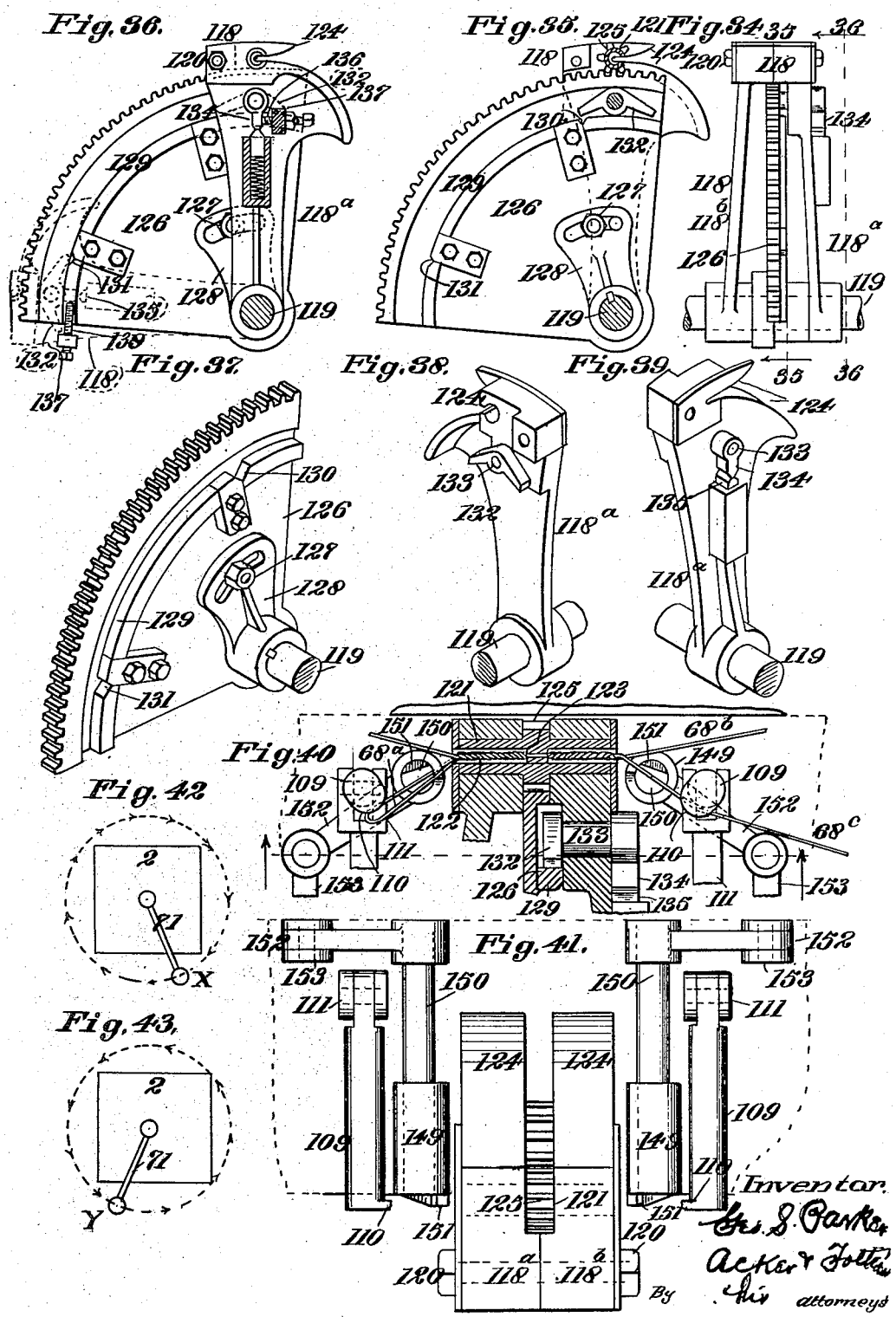

Patented Aug. 30, 1932

1,875,259

UNITED STATES PATENT OFFICE

GEORGE D. PARKER, OF RIVERSIDE, CALIFORNIA; CLARA B. PARKER EXECUTRIX OF SAID GEORGE D. PARKER, DECEASED

APPARATUS FOR WIRE BINDING BOXES

Application filed November 1, 1921. Serial No. 512,132.

The present invention relates to a machine for binding boxes, packages, or similar articles with wire or like material.

The object of the present invention is to provide a machine of the described type which, while automatically binding a box, will keep the binding wire under constant tension, in order to avoid the necessity of drawing up the wire by excessive twisting together of its ends. Such twisting, for the purpose of tightening the wire, very often causes breakage, thus destroying the binding. In the machine embodying the present invention, however, the wire is applied and held under the proper tension, so that its ends need only be twisted together enough to make a secure joint. A further object of the said invention is to provide a machine capable of winding either one or more turns of wire around the box. When extra strength is desired, two or more turns of relatively light wire are preferable to a single turn of heavier wire, for the reason that the lighter wire conforms more easily to the corners of the box and is less liable to break when bent at a sharp angle.

These objects are achieved, in the present invention, by providing a machine in which the box is held stationary, while the wire is wrapped around it. The ends of said wire are then fastened together, by twisting, and subsequently cut off. Means are also provided for moving the box to and away from the binding position, and for holding it in said position. Said means are associated with the binding mechanism in such a manner as to produce a continuous series of successive complete operations, continuing automatically as long as boxes are supplied to the machine.

Although the invention is herewith illustrated and herein described as a machine for binding boxes, it will be apparent that it may be used for binding other objects, such for example as bundles of box shooks, shakes or other articles of like nature, or for binding and tying packages or wrapped parcels. In fact, without any material modification, the machine may be used for binding any object with any suitable binding material. Moreover, although the invention is described and illustrated in its preferred form, it is to be understood that changes, within the scope of the claims hereto appended, may be made in the form and construction of the machine embodying the said invention without departing in any degree from the spirit thereof.

In order to fully comprehend the invention, a preferred embodiment of which will now be described in detail, reference should be had to the accompanying sheets of drawings, wherein:—

Fig. 1 is a front elevation of my winding machine, the conveyer chains and certain other parts being omitted for the sake of clearness.

Fig. 2 is a plan view of the same.

Fig. 3 is a part sectional front elevation, certain portions of the conveying and winding mechanism being omitted for the sake of clearness.

Fig. 4 is a vertical section taken approximately on the line 4..4 of Fig. 1 viewed in the direction of the arrow, certain parts being omitted for the sake of clearness.

Fig. 5 is a perspective view of a portion of the conveyer drive mechanism.

Fig. 6 is a broken front elevation showing the conveyer and driving mechanism.

Fig. 7 is a perspective view, enlarged, of one of the conveyer flights or pusher brackets.

Fig. 8 is a sectional view, enlarged, of the driving mechanism.

Fig. 9 is a partly broken section taken in the direction of the arrow on the line 9..9 of Fig. 8;

Fig. 10 is a section taken in the direction of the arrow on the line 10..10 of Fig. 8.

Fig. 11 is a perspective view of the main shaft driving dog.

Fig. 12 is an end elevation of the same, taken in the direction of the arrow on the line 12..12 of Fig. 8.

Fig. 13 is a part sectional side elevation of the same.

Fig. 14 is an end elevation of the same, taken in the direction of the arrow on the line 14..14 of Fig. 8.

Fig. 15 is a detailed side elevation of the clamping and winding mechanism.

Fig. 16 is a perspective view of the box clamp shown in Fig. 15.

Fig. 17 is a perspective view of the locking dog for the winding mechanism.

Fig. 18 is a perspective view of the adjustment for the winding mechanism connecting rod.

Fig. 19 is a perspective view of the clamp operating cam.

Fig. 20 is a perspective view, enlarged, of one of the winding arms, and its supporting bracket.

Fig. 21 is a perspective detail of the anchor bracket for one of the winding arm supports.

Fig. 22 is a perspective detail of one of the adjustable mountings for the winding arm supports.

Fig. 23 is a detailed view of one of the wire tension clamps.

Fig. 24 is a detailed view of the wire guide at the end of the winding arms shown in Fig. 20.

Fig. 25 is a detailed plan view, enlarged, of the wire twisting mechanism.

Fig. 26 is a sectional detail taken in the direction of the arrow on the line 26..26 of Fig. 25.

Fig. 27 is a detail of the wire twisting drive mechanism.

Fig' 28 is a detail of the wire clamp operating gears.

Fig. 29 is a sectional front elevation of the wire twisting and cutting mechanism, taken approximately on the line 29..29 of Fig. 25 and viewed in the direction of the arrow.

Figs. 30 and 31 are details of one of the wire twisters, showing the position of the parts at the beginning and end, respectively, of the twisting operation.

Fig. 32 is a perspective detail of one of the wire cutter operating mechanisms.

Fig. 33 is a perspective detail of one of the wire cutters.

Fig. 34 is an end elevation of one of the wire twisters.

Figs. 35 and 36 are sections taken respectively on the lines 35..35 and 36..36 of Fig. 34, and viewed in the direction of the arrows.

Fig. 37 is a perspective view of one of the wire twister gear segments.

Figs. 38 and 39 are perspective views showing the inside and outside respectively, of one member of the wire twister arm.

Fig. 40 is a vertical sectional detail showing the operation of the wire twisting, cutting, and clamping mechanisms.

Fig. 41 is a plan view of the same.

Figs. 42 and 43 are diagrams showing the paths of travel of one of the rotatable winding members in two successive operations.

In the drawings, and referring for the present to Figs. 1, 2, 3, and 4, the reference numerals 1 designate a pair of parallel horizontal tracks along which the boxes 2, which are to be bound, are moved in an intermittent motion. Said tracks, which are supported by an independent frame member 1², are grooved, as shown at 3, to receive a pair of spaced endless conveyer chains 4, the latter being shown only in Fig. 4. The chains 4 are provided at regular intervals with flights or pushers constructed, as shown in Figs. 4, 6 and 7, of upright members 5 pivotally carried by brackets 6 let into the chains 4, horizontal spacing members 7, and diagonal pivotally mounted braces 8. Said conveyor chains 4 operate over idler sprockets 9 and 9' and driving sprockets 10 and 10' Figs. 1, 2, 4 and 6, the latter being fixed upon a shaft 11 which is driven by a chain 12 and sprockets 13 from a lower shaft 14, said chain 12 being shown only in Fig. 4. The idler sprockets 9' are freely rotatable upon said shaft 14, which is carried in bearings 14', Fig. 3.

At its left hand end, the shaft 14 has fixed to it a two-toothed gear or driving plate 15, Figs. 1 to 6, having a pair of opposite radial slots 16, Figs. 4 and 5, and a notch 17 cut in its periphery adjacent to each of said slots. A dog or pawl 18, pivotally mounted upon a fixed supporting bracket 19, has a finger 20 adapted to engage said notches 17, and also has an inclined cam surface 21 formed on its under side. A crank arm 22, Figs. 1 to 4, which revolves about a horizontal shaft 23 as its axis, carries a roller 24 which is adapted to first lift the pawl 18 out of its notch 17, by engaging its cam surface 21, and immediately thereafter to enter one of the radial slots 16 in the driving plate 15, and by its continued movement, to rotate said driving plate 15 through half a revolution, as shown in Fig. 4. As the crank arm 22 leaves the driving plate 15, the pawl 18 drops into the opposite notch 17, thereby holding said driving plate in position to receive said crank arm upon its subsequent revolution. The crank arm 22 thus drives the conveyer mechanism in a successive series of step movements. The shaft 23, which is journaled in the side frames 1', supplies power for actuating the remaining parts of the machine, in a manner to be later described. Both said crank arm 22 and said shaft 23 are driven from a common source through mechanism illustrated in detail in Figs. 8 to 14 of the drawings.

An electric motor, shown at 25 in Figs. 1, 3, 4 and 6 may be regarded as typical of any suitable source of power. Said motor drives, through gearing 26, the housing 27 of an epicyclic speed-reducing mechanism, mounted for rotation about the shaft 23. A pair of connected idler pinions 28 and 29, Figs. 8 and 9 are mounted within said housing. The pinion 28, which is slightly smaller in diameter than the pinion 29, meshes with a central gear 30 secured upon or formed integrally with a sleeve 31, said sleeve being rotatable upon the shaft 23, and carrying, at its right-hand end as viewed in Fig. 8, the crank arm 22. The larger pinion 29 meshes with a central gear 32, whose hub is extended to the left of the housing 27, and carries a brake drum 33.

Said drum 33 is encircled by a brake band 34, Figs. 8 and 10, whose ends are connected by a toggle arrangement comprising a yoke 35 and a hand lever 36, Fig. 10, said yoke being connected with one end of said band by an adjusting screw 37. Said band is anchored by a suitable fixed bracket, a portion of which is shown at 38. When the drum 33 is held stationary by the frictional engagement of its band 34, the gear 32 is also held stationary, so that the revolution of the housing 27 and the differential action of its pinions 28 and 29 causes the gears 30 carrying the sleeve 31 and the crank arm 22, to revolve at a greatly reduced speed. When the band 34 is released, the drum 33 and the gear 32 revolve idly, and no movement is imparted to the gear 30 and the sleeve 31. By means of the adjusting screw 37, the maximum tension of the band 34 can be set at such a point that it will just carry the normal load of the machine, but will slip if the load is increased above the normal, thus forming a safety clutch to prevent damage to the machine in the event of jamming. The lever 36 is normally used to start and stop the machine, the motor 25 running continuously.

The sleeve 31 is extended to the left of the brake drum 33, and carries a crank arm 39, Figs. 11, 12, 13 and 14, upon which is pivotally mounted offset dog 40 having a finger 41 adapted to engage a notch 42 formed in the periphery of a drum 43 keyed to the central shaft 23. A spring 44, Figs. 12 and 13, normally holds said dog in engagement with said drum, so that the shaft 23 is rotated by the movement of the sleeve 31. The dog 40 is also provided with an inclined cam surface 45, Figs. 8, 13 and 14, on its under side, which is adapted to be engaged by a movable pin 46, axially slidable within a suitable fixed support 47, and operated by a bellcrank 48. When said pin is in its left-hand or inner position, as shown in Fig. 14, and in full lines in Fig. 8, it engages the dog 40 and lifts the same out of its notch in the drum 43, as shown in dotted lines in Fig. 12, so that the crank arm 39 and said dog 40 revolve freely without rotating the shaft 23. When said pin 46 is withdrawn to the position shown in Fig. 13 and in dotted lines in Fig. 8, the dog 40 is permitted to engage the drum 43, as shown in full lines in Fig. 12.

The releasing pin 46 is operated, through the bell-crank 48, by a link 49, Figs. 2 and 4, a shaft 50, and a lever 51 which lies between the conveyor tracks 1 in such a position that it is depressed by the passage of a box 2 along said tracks. A spring 52 normally holds the lever 51 in its elevated position. In Fig. 4 boxes are shown in the three successive positions within the sphere of action of the machine. The position A is the feed position, in which the unbound box is placed by hand or by other means, not shown in the drawings. The subsequent step movement of the conveyer chains 4 carries the box to the position B, and causes said box to depress the lever 51, thereby withdrawing the pin 46 and allowing the dog 40 to engage the drum 43 and rotate the shaft 23. Such rotation of said shaft 23 actuates the various instrumentalities which bind the box, in a manner to be set forth hereinafter, during the period of rest of said box in the position B. The next movement of the conveyer, which occurs after the binding operation is completed, carries the box to the discharge position C of Fig. 4, whence it is removed from the tracks 1 by any desired means. Therefore it will be seen that the binding mechanism, actuated by the shaft 23 does not function unless a box is in the proper position to be bound.

When a box reaches the position B, and the shaft 23 begins to revolve, the first operation performed thereby is the clamping of the box, to hold it securely in said position B while being bound. For this purpose the shaft 23 carries, near its right-hand end, a groove-cam 53, Figs. 1, 2, 3, 15 and 19, which actuates a lever 54, Figs. 1, 3, 15 and 19, and said lever is connected by a vertical rod 55 with a clamping bar 56, Figs. 1, 3 and 15, which extends across above the machine and is fulcrumed at 57, Figs. 1 and 3 upon a fixed upright 58. The clamping bar 56 carries a bracket 59, Figs. 1, 3, 15 and 16, in which is a vertically adjustable rod 60. At its lower end, said rod carries a clamp comprising horizontal members 61 and laterally adjustable feet 62, said vertical and lateral adjustments being provided to enable the clamp to operate properly on boxes of various sizes. Thus it will be seen that, on account of the shape of the cam 53, the clamping bar 56 is drawn down to cause the feet 62 to bear against the top of the box 2 and clamp the same firmly upon the tracks 1, as shown in full lines in Fig. 15. The dotted lines in said Fig. 15 show the position of the clamp and its operating mechanism when released or raised from the box 2.

The box is wrapped near each end with a binding of wire. For this purpose, there are two similar and oppositely disposed sets of mechanism, one at each side of the machine, both simultaneously operated by a common connection with the shaft 23. A description of one such mechanism will therefore serve for both. Referring to Figs. 1, 2 and 3 of the drawings, the binding wire is carried upon a reel 63 mounted upon a suitable bracket 64 at the side of the machine. The rotation of said reel is retarded, to prevent slack in the wire, by a brake 65, Fig. 2, pressed against the side of the reel by a spring 66, and the tension of the said spring is adjustable by means of a nut 67. A similar reel, not shown in the drawings, is mounted on the opposite side of the machine, each reel supplying the wire for binding one end of each successive box.

The binding wire, which is indicated in Figs. 1, 2 and 3, by the broken line 68, is led from the reel 63 through a hollow horizontal shaft 69, rotatably mounted in a supporting bracket 70. The inner end of said shaft 69 carries a radially adjustable winding arm 71, Figs. 1, 2, 3 and 20, and in the outer end of said arm is fixed a tube 72 parallel with said shaft 69. The wire 68, after passing through the hollow shaft 69, is led over a guide pulley 73 at the end of said shaft, thence through an aperture 74 in an offset in the arm 71, thence over a second guide pulley at 75, and finally through the terminal tube 72 to the box. The guide pulley 73, as shown in Figs. 20 and 23, is split, and its two halves are clamped together to form a tension maintaining brake upon the wire, by a spring 76 whose tension is adjustable by means of a wing nut 77. The second guide pulley 75, as shown in Figs. 20 and 24, is positioned to guide the wire 68 into the tube 72.

The rotary paths of movement of the winding arms 71 about the end portions of the box 2 are clearly indicated in Figs. 1, 2, 3 and 15. For producing this movement, the winding arm shafts 69 are provided with gear pinions 78, which are rotated by gear segments 79, the latter being fixed upon a shaft 80. Said shaft extends across the entire width of the machine, and is journaled in the lower portions of the brackets 70 and also in boxes 81, Fig. 2, which are adjustably mounted upon the side frame members 1'. The right-hand gear segment 79, as shown in Figs. 3 and 15, is connected by a pitman rod 82 with a crank 83, which is fixed upon a short horizontal shaft 84. Said shaft 84 has a driving plate 85, at its other end, provided with two oppositely disposed radial slots 86, adapted to be engaged by a roller 87 carried upon the end of a crank arm 88 mounted upon the shaft 23. A retaining pawl 89, Figs. 15 and 17, is pivotally mounted upon a fixed bracket 90, and has a finger 91 adapted to engage either one of two oppositely disposed notches 92 formed in the periphery of the driving plate 85, to lock said plate in the proper position for engagement by the crank arm roller 87. Said pawl 89 also has an inclined cam surface 93, adapted to be engaged by said roller 87 for the purpose of moving said pawl out of engagement with the driving plate 85. A counter weight 94 normally holds said pawl in engagement with said driving plate.

It will be seen, particularly by reference to Fig. 15, that the continuous rotation of the shaft 23 produces successive intermittent half-revolutions of the shaft 84, and causes the gear segments 79, which are connected together by their shaft 80, to move alternately up and down, with a period of rest at the end of each stroke, the downward movement of said segments rotating the shafts 69 and the winding arms 71 in one direction and the upward movement of said segment rotating said shafts and winding arms in the other direction. Each rotary movement of the winding arms 71 places a binding of wire around a box, and the periods of rest between such movements permit the wire to be tied and cut off in a manner to be described hereinafter, and the box to be released and moved away from the binding position and a new box brought thereto and clamped by the mechanism previously described.

The winding arms and this associated mechanism are adjustable to enable them to function properly with boxes of various sizes. The hollow winding arm shafts 69 are adjustable endwise, toward or away from each other, to accommodate boxes of various lengths, by being slidable within their supporting brackets 70. Thrust collars 95, Figs. 3 and 20 are provided upon said shafts, and said collars and the pinions 78 are secured by set screws 96. Said pinions are also provided with keys, not shown, which engage key-ways in said shafts, one of which is shown at 97 in Fig. 20. The winding arms 71 are adjustable radially with respect to their shafts 69 by means of slots 98 and clamping bolts 99, Figs. 1, 3 and 20.

The winding arm, shafts 69 and the gear segment shaft 80 are maintained in their proper relative positions by the brackets 70, in which both are journaled. The upper portions of said brackets 70 are held in position by pivotally mounted inclined brace rods 100, Figs. 2 and 20, whose lower ends are slidable in blocks 101, Figs. 2 and 21, said blocks being pivotally carried by fixed studs 102 extending inwardly from the side frame members 1'. Set screws 103 are provided for clamping the lower ends of said brace rods 100 in their desired positions. The shaft 80 is also adjustable, as shown in Figs. 2 and 22, its bearing boxes 81 being secured by clamping bolts 104, which pass through slots 105 in the inclined portions 106 of the frame members 1'. Therefore by shifting the shaft 80, and at the same time shifting the positions of the brace rods 100 within their lower supports, the winding arm shafts 69 can be shifted to the approximate centers of the ends of the box.

The pitman rod 82 is also adjustable at both its ends, its bearing pins being shiftable within slots 107 and 108, Figs. 15 and 18, formed respectively in the crank 83 and the gear segment 79. This adjustment is necessary to cause the winding arms 71 to come to rest, at the end of each operation, in the proper positions for the wire to be tied and cut off, as hereinafter set forth. It also provides means for causing the winding arms to make one or more revolutions around the box, as desired. In practice, it is preferable to use a binding consisting of two or more turns of relatively small wire rather than one turn of heavier wire, for the reason that the lighter wire conforms more closely to the corners of the box, and is less liable to break while being tied; but by shortening the effective length of the crank 83, the winding arms can be made to pass only once around the box.

The tying and cutting off of the wire is performed by two similar sets of mechanism actuated by the shaft 23 and so timed as to function immediately after the winding arms have come to rest and before the box clamp is released and the box is moved away from the binding position by the conveyer mechanism. In order to hold the initial end of the wire during the winding thereof, and also to hold the other end of the wound portion of the wire while the same is being tied and cut off, there are provided four clamps, two associated with each tying and cutting mechanism. These four clamps are all similar in construction and operation, each comprising a transversely disposed plunger 109, Figs. 29, 40 and 41 axially slidable within the track member 1 and provided with an offset head 110 adapted to clamp the wire between itself and the side of said track member. The plungers 109 are operated by bell cranks 111, Fig. 29, push-rods 112, and pivotally mounted lifter arms 113, the latter carrying rollers 114 adapted to ride upon the periphery of cams 115. Said cams are fixed upon shafts 116, Figs. 1, 25 and 29, the two clamps upon one side being operated by one of said shafts and the opposite two by the other shaft. Said shafts 116 are continuously rotated by bevel gears 117, Figs. 1, 25 and 28, from the shaft 23. The two clamps associated with each tying and cutting mechanism are spaced sufficiently far apart to permit the ends of the wire to be twisted together between them, as shown in Fig. 40. A better understanding of the operation of said clamps will be had when the combined operations of winding, tying, and cutting the wire are described hereinafter.

There are, of course, two sets of twisting mechanisms, one for each wire. The two sets are oppositely disposed, but are similar in construction and simultaneously operated, so that a description of one will suffice for both. Each of said twisting mechanisms comprises a swinging arm 118, Figs. 1, 2, 25 and 29, whose movement about a horizontal shaft 119 as an axis enables it to remain out of the way of the winding arm until the latter has come to rest, then to move into functional position to twist the wire, and finally to move back to its initial position.

The twisting arm 118 is formed of two adjacent members 118a and 118b, shown particularly in Figs. 25, 34, 38 and 39. Said members are freely rotatable about the shaft 119, and are joined together at their outer ends by a bolt 120, Fig. 34. A rotatable twisting spindle 121, Figs. 35 and 40, is journaled in the end portions of the arm members 118a and 118b, and is provided, throughout its entire length, with a radial slot 122 which, at its central portion, is sufficiently narrow to grip the two wires, as shown at 123 in Fig. 40. Thus when the two adjacent wires are forced into the slot in said twisting spindle and the latter is rotated, the wires are twisted together as shown, forming a strong and permanent union. Flaring guide jaws 124, Figs. 36, 39 and 40, are mounted upon the arm members 118a and 118b to guide the wires into the twister spindle slot 122 when said arm members are brought into functional position.

The twister spindle 121 is provided with gear teeth 125, Figs. 35 and 40, which mesh with the teeth of a gear segment 126 adjustably mounted upon the shaft 119, between the two arm members 118a and 118b. The gear segment 126 itself is free upon said shaft, as shown in Figs. 35, 36 and 37, but is adjustably secured, by means of a clamping bolt 127, to a slotted arm 128 which is keyed to the shaft 119. By this means the gear segment 126 may be so located as to bring the slot 122 in the twisting spindle 121 in the proper position to receive the wires when the arm 118 is moved into functional position.

The gear segment 126 has the double function of swinging the arm 118 into and out of operative position, and rotating the spindle 121 while said arm is in such position. Said segment is provided upon one side with an arcuate rib or shoulder 129, Figs. 34 to 37, having two notches 130 and 131, one near each end. The arm member 118a is provided with a double pawl 132 adapted to engage either of said notches, and said pawl, as shown in Figs. 36, 38, 39 and 40, is fixed upon a pin 133 which extends through the arm member 118a and carries a beveled dog 134, upon its other end, said dog being engaged by a spring pressed latch 135 to hold said pawl at either limit of its movement.

The shaft 119 has an oscillating movement of about 180 degrees. Starting from the position shown in Fig. 29, and regarding, for the present only, the mechanism shown in the left-hand portion of said figure, the first quarter turn of the shaft 119 brings the segment 126 and the arm 118 to the position shown in Fig. 30, in which position the wire lies within the slot of the twisting spindle 121. During this movement, as shown in Fig. 36, the pawl 132 has been in engagement with the notch 130, so that both the segment 126 and the arm 118 have moved as a unit. At the end of this movement, however, the dog 134 strikes against an adjustable stop 136 carried by a fixed bracket, a portion of which is shown at 137, and said pawl is released from said notch 130.

The release of the pawl 132 from the notch allows the arm 118 to stand still, while the segment 126 continues to the position shown in Fig. 31, thereby rotating the spindle 121 and twisting the wire. At the end of this second quarter turn, the shaft 119 reverses its movement, and, as the other arm of the pawl 132 has dropped into the second notch 131, both segment and arm move back a quarter turn together. Said arm is now in the position shown in dotted lines in Fig. 36, whereupon the dog 134 comes into contact with a second adjustable stop 138 carried by a fixed bracket 139, thus releasing the pawl 132 from the notch 131. The final quarter turn of the shaft 119 brings the segment 126 to its initial position, as shown in Fig. 29, the arm 118 remaining stationary in its horizontal or inoperative position.

The opposite twisting mechanism, shown in the right-hand portions of Figs. 25 and 29, operates similarly. Both shafts 119 carry bevel gears 140, Figs. 25 and 26, which mesh with bevel gear segments 141 carried by a transverse shaft 142. The latter shaft also carries a spur gear segment 143, Figs. 2 and 27, which meshes with a similar gear segment 144 formed upon one end of a lever 145. Said lever, which is pivoted at 146, carries, at its other end a roller 147 adapted to follow the groove of a cam 148 mounted upon the main shaft 23. Thus the intermittent oscillation of the shaft 119 is produced by the continuous rotation of the shaft 23, the cam 148 being so formed and positioned as to cause the movements of the shafts 119 to occur at the proper times in the cycle of operations of the machine.

The two ends of each wire are cut off after being twisted together, by two similar cutting devices, one positioned on each side of the twisting mechanism, between it and the clamp 109. Each of said cutters comprises a fixed sleeve 149, Figs. 40 and 41, mounted in the track member 1, and an oscillating shaft 150 within said sleeve, said sleeve and said shaft being formed with co-operating cutter blades 151, Figs. 33 and 40, upon their ends. The shaft 150 is oscillated by an arm 152, Figs. 29 and 32, a link 153, a bell-crank 154, and a cam 155, which is mounted upon the shaft 119 and which engages a roller 156 carried by said bell-crank 154. There are, of course, four such sets of cutting devices, two upon each side.

It will be recalled that the winding arms 71 revolve first in one direction and then in the other, alternate winding operations being in the same direction. Considering for the present one side only of the machine, the successive movements of the winding arm 71 can be clearly understood from the diagrams shown in Figs. 42 and 43. Assuming that in the first operation, the winding arm 71 starts from the position shown at X in Fig. 42, and proceeds in the direction of the arrows, it will come to rest in the position shown at Y in Fig. 43, that is, after making the desired number of turns (say for example two) about the box, said winding arm proceeds beyond the lower center and comes to rest in a position corresponding to its initial position, but on the other side of said center so as to overlap portions of the wire in a plane parallel to the side of the object, whereby a flat knot can be formed upon subsequent intertwisting of the overlapped portions. During the next winding operation, the arm 71, starting from the position Y of Fig. 43 and moving in the direction of the arrows, revolves slightly more than twice around the box and comes to rest in the position X of Fig. 42.

Fig. 40 shows the various parts at the completion of the second cycle described above. The winding arm, which is not shown in said Fig. 40, had started from a position to the left of the tying mechanism, corresponding to the position Y of Fig. 43, and revolving counterclockwise around the box, has come to rest to the right of the tying mechanism, in a position corresponding to X of Fig. 42. The initial 68a of the wire has been held by the left-hand clamp 109 during the winding operation. The right-hand clamp 109 has remained closed, so that the first strand or loop of the wire, designated by 68b, was not caught by it, but, at the final passage of the winding arm, laying down the last portion 68c of the binding, said right-hand clamp was opened to receive said wire 68c, and is now holding the same securely while the twist is being made by the rotating spindle 121. When this is complete, the cutters 151 will operate to cut off both ends of the wire, and the arm 118 will move down to the inoperative position. The end 68c of the wire, however, will remain held by the right-hand clamp 109, and this end will be the beginning of the next binding, to place which the binding arm will travel in a clock-wise direction, coming to rest on the left of the tying mechanism, in a position corresponding to Y of Fig. 43.

A brief review of the operation of the entire machine through one complete cycle will show clearly the timely relations existing between the movements of the various sets of mechanism. When the machine is started, by means of the clutch lever 36, the conveyer at once moves forward one step, carrying a box from the position A to the position B of Fig. 4. This movement of the box depresses the lever 51, and the shaft 23 thereupon begins to make one complete revolution, which successively causes the clamping of the box, the winding of the wire thereabout, the tying and the cutting off of said wire, and the release of the box. This is the end of one cycle of operations, and if, upon the next step movement of the conveyer, which follows immediately upon the release of the clamp, a new box is not brought to the position B, the lever 51 is not depressed and the shaft 23 remains stationary.

From the foregoing, it will be observed that the shaft 23, hereinafter referred to as the actuating shaft, controls the action of the inter-connected timed operating elements of the apparatus for controlling the feed of the wire, the winding of the wire around the box to be wire bound, twisting the ends of the wire after a predetermined number of winds have been given thereto, severing the ends of the twisted wires, and for returning the elements after the respective operation thereof to normal position for operation relative to another box to be wire bound; that the said actuating shaft has rotation imparted thereto for the actuation of the respective inter-connected elements from a suitable source of continuous operating drive or power means, the connecting of the said shaft with the power means automatically controlled by the delivery of a box to be wire bound at the binding station B of the apparatus, said positioning of a box at such station throwing into active operation the means for coupling the actuating shaft with the drive mechanism, so that the operative inter-connective elements of the apparatus only come into operative movement on the positioning of a box to be wire bound, in other words, no positioning at the binding station of a box to be wire bound, no action of the wire feed, wire winding mechanism, wire twisting elements and wire cutting means.

A preferred embodiment of an operative apparatus for the carrying out of the invention has been illustrated and described herein, but I am well aware that such detailed mechanism may be varied without creating a departure from the spirit of the invention, and do not wish to be understood as confining or limiting the invention to the form of the apparatus shown and described, but on the contrary wish to be understood as claiming the invention as broadly as the state of the art will warrant, it being understood that by the expression "box" as employed in the appended claims is meant any form of an article or package to be wire bound, and by the expression "wire" is meant any suitable binding strip, whether rectangular or round, or otherwise in cross section.

Having thus described my invention, what I claim as new and desire to secure by Letters Patent of the United States is:—

1. An apparatus for the wire binding of boxes and similar articles, the same comprising inter-connected timed operative instrumentalities for winding wires under tension around a box to be bound, disposing the terminal sections of the wire in overlying relation, twisting the terminal overlying sections of the wires on the completion of the winding operation and severing the ends of the twisted wires, an actuating shaft for controlling the action of said instrumentalities in timed relation, and means thrown into action by the positioning of a box at the binding station of the apparatus for causing operative movement of the actuating shaft.

2. An apparatus for the wire binding of boxes and similar articles, the same comprising independently operated inter-connected working instrumentalities for winding of wires under tension about a box to be bound, disposing the terminal sections of the wire in overlapping relation, twisting the overlying terminal end sections of the wires and on a completion of the winding operation severing the ends of the twisted wires, and means thrown into action by the positioning of a box to be bound at the binding station of the apparatus for automatically placing into operation in timed relation the said mentioned inter-connected working instrumentalities.

3. An apparatus for the wire binding of boxes or similar articles, the same comprising a suitable frame structure, carrier means for intermittently advancing a box to be bound, means for winding wires under tension around a positioned box, and placing the terminal end sections of the wire in overlying relation, wire twisting means acting upon the terminal overlying sections of the wire, wire cutting means, actuating mechanism adapted to operate said respective means in timed relation, and means thrown into action by a box to be bound being positioned at the binding station of the apparatus for transmitting operative motion to the actuating mechanism.

4. An apparatus for the described purpose, the same comprising an endless carrier for receiving boxes to be wire bound, advancing same to a binding station, and discharging the wire bound box, mechanism for imparting intermittent movement to said carrier, wire winding means situated at the binding station for the winding of wires under tension around the box and disposing the terminal end sections of the wire in overlapping relation, twisting means situated intermediate the winding means for receiving the terminal overlying end sections of the wound wire and twisting the same for uniting, cutting means interconnected with the twisting means for severing the ends of the twisted wires, and mechanism thrown into action by the positioning of a box at the binding station for automatically actuating the winding, the twisting, and cutting means in timed relation.

5. In an apparatus for the described purpose, the combination with means for advancing and bringing a box to be bound to rest at a binding station, of wire winding means situated at said station for winding wires under tension around said box, a device for receiving and holding the terminal end sections of the wire in overlapping relation, means for twisting the terminal overlying end sections of the wire, a device for cutting the ends of the twisted wires and means situated at the binding station adapted to be operated by the positioning of a box for automatically placing into operation mechanism for actuating the winding means.

6. In an apparatus for the described purpose, the combination with means for receiving, advancing and successively positioning boxes to be wire bound at a binding station, of wire winding means situated at said station for winding wires under tension around the boxes, means for receiving the terminal end sections of the wound wires in overlying relation and twisting the same, means for cutting the terminal end sections of the twisted wires, and mechanism for automatically actuating said respective means in timed relation by the positioning of a box to be bound at the binding station of the apparatus.

7. In an apparatus for the described purpose, the combination with an intermittently traveling endless carrier for receiving and advancing through the apparatus boxes to be wire bound, of means for winding wires under tension around a box while resting at a binding station of the apparatus, means for receiving and holding the terminal end sections of the wire in overlying relation, rotary means for twisting the terminal overlying end sections of the wire, wire cutting means, and mechanism for automatically actuating said means in timed relation by a box to be wire bound being positioned at the binding station.

8. In an apparatus for the described purpose provided with a binding station, wire winding means situated at said station for winding wire under tension about a box to be bound, means for positioning at said station and within the sphere of the winding means a box to be wire bound, means for clamping the box at said station and holding the same against movement until completion of the wire binding thereof, and mechanism for automatically actuating the clamping means and the wire winding means in timed relation.

9. In an apparatus for the described purpose, the combination with means for delivering a box to be wire bound at a binding station, means for clamping the box at said station, alternatingly swinging means for winding wires under tension about said box, means for receiving and holding the terminal end sections of the wire in overlying relation, means for twisting the terminal end sections of the wound wires, means for cutting the ends of said twisted wires, and spring held means adapted to be actuated by a positioned box for automatically actuating said means respectively in timed relation.

10. In an apparatus for the described purpose, the combination with inter-connected working instrumentalities for winding wires under tension around a box to be wire bound, inter-connected means for receiving and holding the terminal end sections of the wound wire in overlying relation and twisting the terminal overlying ends of the wires on the completion of the box binding, and for severing the ends of the twisted wires, of means for automatically controlling the operative movements of said respective means in accordance as to whether or not a box is positioned for the wire binding thereof.

11. In an apparatus for the described purpose, the combination with means for intermittently advancing boxes to be wire bound to a binding station, of an actuating shaft, power drive mechanism for imparting rotation to said shaft, clamping means for holding a box to be wire bound at the binding station, devices thrown into action on the positioning of a box at the said station for actuating the box clamping means, and connecting the actuating shaft with the power drive mechanism, and interconnected instrumentalities thrown into action by the movement of the actuating shaft for winding wire under tension around a positioned box, receiving and holding the terminal ends of the wound wire in overlying relation, and twisting the wire on the completion of the winding operation and severing the ends of the twisted wires.

12. In an apparatus for the described purpose provided with a binding station, of an adjustable clamp for holding a box to be wire bound clamped at said station, working instrumentalities for the winding of wires under tension around said box, receiving and holding the terminal ends of the wound wires in overlying relation, twisting the wires on the completion of the winding operation and severing the ends of the twisted wires, and means thrown into action on the positioning of a box at the binding station for operating respectively said mentioned clamping means and interconnected working instrumentalities in timed relation.

13. In an apparatus for the described purpose, the combination with the wire winding mechanism thereof, of spaced swinging twister arms each carrying at its outer end a radially slotted geared tooth twister spindle, gear segments for imparting rotation to said twister spindles, means for throwing the twister arms to position the twister to receive in the radial slot thereof the wires on the completion of a wire binding operation and actuating the gear segments to impart rotation to the spindles after the wires have been received in the radial slot thereof, and means for severing the ends of the twisted wires.

14. In an apparatus for the described purpose, the combination with the wire winding mechanisms thereof, of means for controlling the operation of said mechanism in accordance with the number of wire windings for a box to be wire bound.

15. In an apparatus for the described purpose, the combination with oppositely disposed spaced wire winding mechanisms, adjustable devices for controlling the operation of said mechanisms in accordance with the number of wire windings to be given a box, means for holding a box fixed within the sphere of the winding mechanisms during the operation of wire binding, wire feed means, and devices for regulating the tension of the wires fed to the wire winding mechanisms.

16. In an apparatus for the described purpose, the combination with mechanism for winding wire under tension around a box to be bound, of wire guiding means and means for controlling the action of the wire winding mechanism for regulating the number of wire windings to be given to a box to be wire bound.

17. In an apparatus for the described purpose, a bundle support, means for moving a bundle into binding position relative to said support, means for winding wire under tension about a bundle positioned on the support, devices for receiving and holding the terminal ends of the wound wire in overlying relation and in the plane of said support, means for twisting the overlying terminal end portions of the wire and means for severing the wire bound tie thereof.

18. An apparatus for the wire binding of boxes and similar articles, the same comprising means for feeding boxes successively to a binding station, connected tying operated instrumentalities for winding wire under tension around a box positioned at the binding station, disposing the terminal sections of the wire in overlying relation, twisting the terminal overlying sections of the wire on the completion of the winding operation and severing the ends of the twisted wires, and mechanism for controlling the action of said instrumentalities in timed relation.

19. An apparatus for the described purpose, the same comprising a support for sustaining a bundle to be wirebound at a binding station, rotatable mechanism for winding wire under tension over faces of the positioned bundle and positioning the terminal end sections of the wire in overlying relation, devices for holding the end sections so positioned, means situated intermediate the holding devices for twisting the overlying end sections of the wire in a plane parallel with that of the bundle support, cutting devices for severing the twisted wire beyond its tie, and mechanism for actuating the winding, holding, twisting and cutting instrumentalities in timed relation.

20. In a bundle tying machine, bundle supporting means, a rotatably mounted member, means for rotating the member in opposite directions and means carried by the member for passing a wire around the bundle for either direction of rotation of the member.

21. In a bundle tying machine, bundle supporting means, a rotatably mounted member, means for rotating the member alternately in opposite directions and means carried by the member for passing a wire around the bundle for either direction of rotation of the member.

22. In a bundle tying machine, bundle supporting means, a rotatably mounted member, means carried by the member for passing a wire around the bundle, means for rotating the member through a cycle in one direction, means for stopping the rotation of the member at the end of the cycle and means for reversing the driving connections of the member so that in the next cycle of operation the member will be rotated in the opposite direction.

23. In a bundle tying machine, means for supporting the bundle to be tied, a rotatably mounted member associated with said support, means carried by the member for passing a wire around the bundle, driving means for alternately rotating the member in opposite directions whereby the wire is passed in opposite directions around successive bundles and means for maintaining the wire taut during both directions of rotation of the member.

24. In a bundle tying machine, means for supporting the bundle to be tied, a rotatably mounted member associated with said support, means carried by the member for passing a wire around the bundle, a motor for driving said member, a reversing mechanism interposed between the motor and the member and means operative upon the completion of a tying operation for operating the reversing mechanism whereby the member rotates in the opposite direction.

25. In a bundle tying machine, means for supporting the bundle to be tied, a rotatably mounted member associated with said support, means carried by the member for passing a wire around the bundle, a motor for driving the member, a clutch and a reversing mechanism interposed between the motor and the member, means operative upon the completion of a tying operation for disengaging the clutch and means operative upon the completion of a tying operation for operating the reversing mechanism.

26. In a bundle tying machine, a rotatably mounted member adapted to be rotated in one direction to pass a wire around a package, wire twisting means in which overlapping portions of the wire are disposed, a gripper arranged to engage the wire of the overlapping portion adjacent the twister, means for cutting the wire between the gripper and the twister and means for rotating the member in the opposite direction, the reverse movement of the member serving to bend the wire around the gripper.

27. In a bundle tying machine, means for passing a wire in one direction around a bundle, a gripper for clamping the wire after it has passed around the bundle, means for tying the wire passed around the bundle, means for cutting the tied portion of the wire from the wire and means for reversing the direction of movement of the wire passing means to pass a wire around another bundle in the opposite direction, the reversal of the direction of movement of said means serving to bend the wire around the gripper.

28. In a bundle tying machine, means for gripping the wire at the end of its movement around the bundle in one direction and means for passing a wire around the bundle in the opposite direction whereby the wire is bent over the gripping means.

29. In a bundle tying machine, a wire gripper, means for operating the gripper to clamp the wire, means for passing the wire around the bundle in a direction to bend it around the gripper and means for holding the wire in tension.

30. In a bundle tying machine, a wire feeding member, means for alternately rotating the member in opposite directions to pass the wire around successive bundles in opposite directions, means operative at the end of each rotation of the member for twisting overlapping portions of the wire together to tie the wire around the bundle and means for cutting the tied portion of the wire from the wire.

31. In a bundle tying machine, bundle supporting means, rotatable means for tightly winding the tie member in either direction around the bundle with one portion lying adjacent another portion, and means for twisting the adjacent portions of the tie member together.

32. In a bundle tying machine, bundle supporting means, rotatable means for tightly winding a tie member in either direction around the bundle with one portion of the tie member overlapping another portion of the tie member in a plane parallel to the side of the bundle, and means for twisting together the overlapping portions of the tie member.

33. In a bundle tying machine, bundle supporting means, rotatable means for tightly winding a wire in either direction around the bundle, with one portion of the wire overlapping another portion of the wire in a plane parallel to the side of the bundle, and means for uniting the overlapping portions of the wire to form a tie which lies flat against said bundle side.

34. In a bundle tying machine, bundle supporting means, a rotatably mounted element, means for rotating the element at least a complete revolution in either direction, means carried by the element for passing a wire around the bundle for either direction of rotation of the element.

35. In a bundle tying machine, bundle supporting means, and rotatable means for tightly winding a tie member in either of two directions around the bundle.

36. In a bundle tying machine, bundle supporting means, rotatable means for tightly winding a tie member in either of two directions around the bundle with the ends of the tie member in overlapping relation, and means for uniting the overlapping ends of the tie member.

37. In combination, a machine having mechanism for automatically placing binding wire under tension on a bundle with the ends extending in opposite overlapping relation, a slotted rotatable twister, means movable on a pivot mounting the twister for movement through a predetermined arc relative to said bundle, and operating means on said machine for automatically operating the binding mechanism, twister and mounting means in timed relation to successively place wire binding on the bundle, move the twister to engage and twist the ends to form a flat tie and disengage the twister from the twisted ends.

38. In combination, a machine having mechanism for automatically placing binding wire under tension on a bundle with the ends positioned in overlapped relation, a slotted rotatable twister, means mounting the twister for movement relative to the bundle, and operating means for the twister and mounting means for moving said twister to receive the wire ends in the slotted portion and twist said ends to form a flat tie and subsequently move out of engagement with the wire, and automatically operated in timed relation with the binding mechanism.

39. In an apparatus for the described purpose provided with a binding station, means for fixedly positioning boxes to be wire bound at said binding station, means for positively winding wire under tension about the positioned box, means for receiving and holding the terminal sections of the wire in overlying relation, means for twisting the terminal end sections of the wound wire and means for cutting the ends of said wire, and mechanism for automatically actuating said means in timed relation.

40. In an apparatus for the described purpose provided with a binding station, of means for successively positioning boxes to be wire bound at the binding station, means for clamping boxes at said station against movement during the operation of wire binding, means situated at said station for positively winding wires under tension about the clamped box, means for positioning the terminal ends in overlying relation, means for twisting the overlying terminal end sections of the wound wires, means for severing the ends thereof after twisting, and mechanism for actuating said respective means in timed relation.

41. In an apparatus for the described purpose, the combination of interconnected working instrumentalities for the winding of wires under tension around a box to be bound including means for receiving and holding the terminal end sections of the wire in overlying relation, means for twisting the wire on the completion of the binding operation, means for severing the ends of said twisted wires, of means for clamping a box to be wire bound within the sphere of the winding mechanism, and means for actuating said clamping means and throwing into action respectively the wire winding, twisting and severing means by a box being brought to position at the binding station of the apparatus.

42. In an apparatus for the described purpose, the combination with the wire winding mechanism thereof, of a plurality of twisting arms each composed of two members carrying a radially slotted wire twisting spindle, means for actuating said spindles on wires being received therein for a twisting thereof, wire cutters for severing the ends of the twisted wires, and mechanism for actuating said twisting spindles in timed relation with the movement of the wire binding mechanism.

43. In an apparatus of the character described, bundle supporting means, rotatable means for tightly winding a tie member under tension around the bundle so that the meeting portions of the tie member are in relative parallelism with each other and in relative parallelism with the adjacent face of the bundle, and means for twisting upon each other the parallel portions of the tie member so as to form a joining parallel with the adjacent face of the bundle.

44. In a tying machine, means for effecting encircling of a tensioned binding wire about an object to be bound and tied, and means for securing the wire in a substantially flat joint.

45. In a tying machine, means for supporting an object to be bound and tied in a fixed location, means for winding a tensioned binding wire about the fixedly located object, and means for securing the wire in a substantially flat joint.

46. In a tying machine, means for effecting encircling of a binding wire about an object to be tied, said means including a wire guiding member mounted for movement in a path about the object, and means for securing the strip in a substantially flat joint.

47. In a tying machine, means for supporting an object to be tied in a fixed location, means for winding a binding wire about the fixedly located object, said means including a wire guiding member mounted for movement in a path about the object, and means for securing the wire in a substantially flat joint.

48. In a tying machine, a member mounted for movement to describe a path about an object to be tied, means for supplying a binding wire to said member, means for moving the member to effect encircling of the wire about the object, and means for securing the wire in a substantially flat joint.

49. In a tying machine, a member mounted for movement to describe a path encircling an object to be tied, means for supplying a binding wire to said member, means for clamping the wire adjacent the object, means for moving the member to effect encircling of the clamped wire about the object, and means for securing the wire in a substantially flat joint.

50. In a tying machine, a member mounted for movement to describe a path encircling an object to be tied, means for supplying a binding wire to said member, means for clamping the strip adjacent the object, means for moving the member to effect encircling of the clamped wire about the object, means for securing the strip in a substantially flat joint, means for severing the wire from the secured portion, and means for releasing the clamping means and reclamping the wire.

51. In a tying machine, a member mounted for movement to describe a path about an object to be tied, means for supplying a binding wire to said member, means for clamping the wire adjacent the object, means for moving the member in one direction to effect encircling of the clamped wire about the object, means for securing the wire, and means for moving the member in an opposite direction.

52. In a tying machine, a member mounted for movement to describe a path encircling an object to be tied, means for supplying a binding wire to said member, means for moving the member to effect encircling of the wire about the object, means for supporting the object in a fixed location during movement of said member, and means for securing the wire in a substantially flat joint.

53. In a wire tying machine, means for effecting encircling of a wire while under tension about an object to be tied so that one portion of the wire overlaps another portion thereof in a plane substantially parallel to the adjacent surface of the object, and means for securing the overlapped portions of the wire to provide a substantially flat joint.

54. In a wire tying machine, a member mounted for movement to describe a path encircling an object to be tied, means for supplying wire under tension to said member, means for moving the member to effect encircling of the wire about the object so that one portion of the wire overlaps another portion thereof in a plane substantially parallel to the adjacent surface of the object, and means for intertwisting the overlapped portions to provide a substantially flat knot.

55. In a wire tying machine, a member mounted for orbital movement about an object to be tied, means for supplying wire to said member, means for rotating the member to effect encircling of the wire about the object, and means for intertwisting adjacent portions of the wire into a substantially flat knot.

56. In a wire tying machine, a member mounted for movement to describe a path about an object to be tied, means for supplying wire to said member, means for moving the member to effect encircling of the wire about the object so that one portion of the wire overlaps another portion thereof in a plane substantially parallel to the object, means for intertwisting the overlapped portions to provide a substantially flat knot, and means for moving the member in an opposite direction.

57. In a tying machine, means for effecting encircling of a binding wire in a plurality of directions about objects to be bound and tied, and means for securing the encircled wire.

58. In a tying machine, means for effecting encircling of a binding wire in either one of opposite directions about objects to be bound and tied, and means for securing the encircled wire.

59. In a binding machine, means for effecting encircling of a binding wire in one direction about an object to be bound, and means for effecting encircling of said wire in an opposite direction for another binding operation.

60. In a binding machine, a member mounted for movement to describe a path about an object to be bound, means for supplying a binding wire to said member, and means for moving said member in opposite directions.

61. In a binding machine, a member mounted for movement to describe a path about an object to be bound, means for supplying a binding wire to said member, driving means including a member movable only in one direction, and means interposed between said member of the driving means and the first mentioned member for effecting movement of the first mentioned member in opposite directions.

62. In a binding machine, means for effecting encircling of a binding wire in a plurality of directions about objects to be bound, wire clamping means associated with said encircling means, and means for conditioning said clamping means in accordance with the directions of encircling of the wire.

63. In a binding machine, means for effecting winding of a binding wire about objects in opposite directions, spaced members for clamping said wire, means for conditioning said clamping members for the winding of the wire in one direction, and means for conditioning said clamping members for the winding of the wire in an opposite direction.

64. In a wire tying machine, a wire guiding member movable in opposite directions to effect winding of wire about objects to be tied, and means for tying the wire.

65. In a wire tying machine, a wire guiding member movable in one direction to effect winding of wire about an object to be tied, means for effecting movement of the member in an opposite direction for another winding operation, and a single securing means for tying the wire in either direction of winding thereof.

66. In a wire tying machine, means for forming a substantially flat knot in wire wound about an object, a pair of wire clamping members between which said means is located, means for effecting winding of successive bands of wire about objects in opposite directions, and means for correlating the operation of the clamping members in accordance with the direction of winding of the wire.

67. In a wire tying machine, a member movable to describe a closed path, means for supplying wire to said member to effect winding of wire about an object enclosed by said path, and means for mounting said member for movement in either direction around said path.

68. In a binding machine, wire guiding means rotatable in opposite directions for encompassing objects with said wire, and means for supporting the objects.

69. In a binding machine, wire guiding means rotatable in opposite directions for encompassing objects with said wire, and means for supporting an object in a relatively fixed location while the object is being encompassed by the wire.

70. In a binding machine, means rotatable in opposite directions for encompassing objects with binding means, means for rotating the rotatable means in one direction for effecting encompassing of an object, and means for rotating the rotatable means in an opposite direction for effecting a succeeding encompassing operation.

71. In a bundle binding and tying machine, means rotatable in opposite directions for encompassing objects with binding wire, and means for securing the binding means in a substantially flat joint.

72. In a wire binding and tying machine, means rotatable in one direction for encompassing an object with binding wire and for overlapping portions of the wire, means for forming a substantially flat knot of the overlapped portions, and means for effecting rotation of the rotatable means in an opposite direction for another encompassing operation.

73. In a wire binding and tying machine, means rotatable in opposite directions for encompassing objects with binding wire, means for supporting the objects in a fixed location, and means for securing the bound wire in a substantially flat knot.

74. In a wire binding and tying machine, a wire guiding member movable in opposite directions for effecting encompassing of objects by wire, means for supplying a strip of binding wire to said member, means for tensioning the strip, a pair of spaced clamping members, means for conditioning said clamping members for clamping the wire when the guiding member is moved in one direction, means for conditioning said clamping members when the guiding member is moved in an opposite direction, wire securing means located between said spaced clamping members, and means for correlating the operation of the clamping members, guiding member and securing means in timed relationship.

75. In a bundle tying machine, a rotatably mounted means for passing wire around a bundle, means for alternately rotating said passing means in opposite directions comprising a motor, a rotatable member driven in one direction thereby, a gear by which said passing means is rotated, and means connected with said member for rotating the gear alternately in opposite directions.

76. In a bundle tying machine, a rotatably mounted means for passing a wire around a bundle, a gear for driving said passing means, a member adapted to be rotated in one direction, and a pitman connecting said gear and said member.

77. In a bundle tying machine, a rotatably mounted means adapted alternately to be rotated in opposite directions to pass a wire around a bundle, a source of unidirectional rotary motion, and a pitman connecting said wire passing means to said source of rotary motion.

78. A method of binding and tying a bundle with wire which comprises maintaining the bundle in a relatively fixed position, encircling the bundle while thus positioned with wire while under tension so that portions of the wire are caused to overlap in a plane substantially parallel to the adjacent surface of the bundle, and securing the overlapped portions to form a substantially flat knot.

79. A method of binding and tying bundles with wire which comprises holding an end of the wire adjacent a bundle, encircling the wire thus held about the bundle and past the held portion so that portions of the wire are caused to overlap, securing the overlapped portions, holding the wire in a different position for a succeeding winding operation, and then winding the wire in an opposite direction.

80. In a wire tying machine, twisting means for forming a flat knot from overlapped portions of wire, means movable in a direction to effect encircling of the wire about an object to be bound and tied and for overlapping said portions in position for the twisting means, and means for mounting said movable means to allow movement in an opposite direction after formation of the knot.

81. In a wire tying machine, rotatable means for effecting encircling of wire about an object to be bound and tied, means for supplying wire under tension to said rotatable means, means for rotating the rotatable means more than a revolution in one direction to overlap portions of the encircled wire in a plane substantially parallel to the adjacent surface of the object, means for twisting together said portions to form a flat knot, and means for reversing the direction of movement of the rotatable means after formation of the knot.

82. In a wire tying machine, a support for an object to be bound and tied, spaced wire clamping members in substantially fixed position relative to the support, twisting means for forming a flat knot between said clamping members and from overlapped portions of the wire, rotatable means for effecting encircling of the wire about the object and for overlapping said portions between the clamping members, and means for reversing the direction of movement of the rotatable means after formation of the knot.

83. In a wire tying machine, spaced wire clamping members, twisting means for forming a flat knot between said clamping members and from overlapped portions of the wire, rotatable means for effecting encircling of the wire about an object and for overlapping said portions between the clamping members, means for reversing the direction of movement of the rotatable means after formation of the knot, and means for conditioning said clamping members in accordance with the direction of rotation of said rotatable means.

In testimony whereof I have signed my name to this specification.

GEORGE D. PARKER.